United States Patent [19]

Moriya et al.

[11] Patent Number: 4,964,009
[45] Date of Patent: * Oct. 16, 1990

[54] MAGNETIC DISK HAVING AN INDEX AREA AND A LIMITED NUMBER OF RADIALLY EXTENDING SERVO SECTIONS

[75] Inventors: Kazunori Moriya, Yokohama; Nobuyuki Takagi, Koganei; Toshihiro Sugaya, Seki; Norio Nakamura, Yokohama, all of Japan

[73] Assignee: Kabushiki Kaisha Toshiba, Kawasaki, Japan

[*] Notice: The portion of the term of this patent subsequent to Jan. 23, 2007 has been disclaimed.

[21] Appl. No.: 436,035

[22] Filed: Nov. 14, 1989

Related U.S. Application Data

[63] Continuation of Ser. No. 259,429, Oct. 18, 1988, Pat. No. 4,896,240, which is a continuation of Ser. No. 911,120, Sep. 24, 1986, abandoned.

[30] Foreign Application Priority Data

Sep. 24, 1985 [JP] Japan .................................. 60-210424

[51] Int. Cl.$^5$ ................................................ G11B 5/82
[52] U.S. Cl. ................................ 360/135; 360/77.07; 360/77.08
[58] Field of Search ............... 360/77.01, 77.02, 77.07, 360/77.08, 78.04, 135

Primary Examiner—Vincent P. Canney
Assistant Examiner—David L. Robertson
Attorney, Agent, or Firm—Oblon, Spivak, McClelland, Maier & Neustadt

[57] ABSTRACT

A magnetic disk, which is used for recording and reproducing data with a read/write head. The magnetic disk has an index area with an index signal recorded therein and a plurality of servo sectors formed between a plurality of data areas subsequent to the index area. Each servo sector has a servo information area, in which a servo information pattern adapted for positioning the read/write head is formed, and first and second gap sections provided on the both sides of the servo information area for absorbing rotational variations of the disk.

3 Claims, 7 Drawing Sheets

MAGNETIC DISK HAVING AN INDEX AREA AND A LIMITED NUMBER OF RADIALLY EXTENDING SERVO SECTIONS

This is a continuation of application Ser. No. 259,429, filed on Oct. 18, 1988, now U.S. Pat. No. 4,896,240, which is a continuation of application Ser. No. 911,120, filed Sept. 24, 1986, now abandoned.

BACKGROUND OF THE INVENTION

This invention relates to a magnetic servo system and, more particularly, to a magnetic disk having a data surface for positioning a magnetic head on the magnetic disk using servo information embedded in the data surface of the magnetic disk.

As a magnetic disk data surface servo system, there has been known a sector servo system and an index servo system. In the sector servo system, a plurality of servo sectors are formed in the data surface of a magnetic disk. Each servo sector is formed such that servo information is embedded therein, and the magnetic head is positioned according to servo information signals obtained from each servo section through the magnetic head. In this servo system, the servo information signals are obtained over the entire circumference of the disk, so that it is not influenced by the eccentricity of the disk. For this reason, this servo system is well suited for a magnetic disk device adapted for replaceable disks. Further, since the servo information is obtained over the entire circumference of the disk, accurate positioning of the head can be obtained even if there is drop-out of some servo information. However, since in this servo system servo information is embedded, basically the magnetic disk is regarded as having a hard sector structure. Therefore, if it is intended to format the disk at the magnetic disk device employing having the servo system, a gap has to be provided between adjacent sectors to absorb rotational variations caused during rotation of the disk. The provision of such a gap greatly reduces the formatting efficiency.

The index servo system is advantageous for increasing the track density of the disk of a small-size rigid magnetic disk device which does not require a capability for teaching eccentricity of a magnetic disk. In this servo system, an index area is provided on part of the data surface of the magnetic disk where servo information is embedded. The head position is corrected once per rotation of disk using the servo information in this area. Thus, the formatting of soft sectors is made possible as in a non-servo magnetic disk device. In this servo system, however, accurate positioning of the head becomes impossible if any drop-out of servo information occurs due to such causes as external noise or defects of a disk, since only the servo information in the index area can be utilized.

An improved index servo system is disclosed in a copending U.S. patent application Ser. No. 841,820, entitled "Magnetic Disk Having Data Area and Index Servo Area and Servo System for Positioning Read/Write Head on Magnetic Disk", filed Mar. 30, 1986 and assigned to the same assignee as this application.

SUMMARY OF THE INVENTION

An object of the invention is to provide an improved data-surface servo system for a magnetic disk.

Another object of the invention is to provide a data-surface servo system which is capable of formatting soft sectors.

A further object of the invention is to provide a magnetic disk having a data-surface servo system, which is not influenced by external noise or medium defects.

BRIEF DESCRIPTION OF THE DRAWINGS

FIG. I schematically shows a magnetic disk according to an embodiment of the data-surface servo system according to the invention and a servo pattern of a servo area.

DETAILED DESCRIPTION OF THE PREFERRED EMBODIMENT

Figure 1:
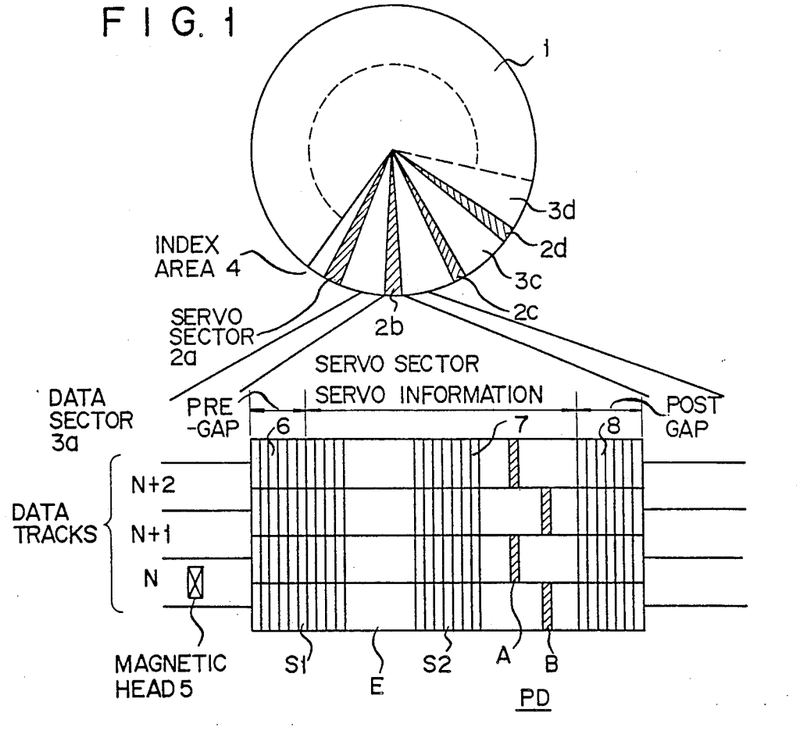

Referring now to FIG. 1, a magnetic disk 1 according to an embodiment of the invention has four embedded servo sectors 2a to 2d. These servo sectors are each formed subsequent to index area 4 in the order of servo sector 2a, data sector 3a, servo sector 2b, data sector 3b, servo sector 2c, data sector 3c, servo sector 2d and data sector 3d. A format pattern, with which the disk is formatted, is recorded in an area from data sector 3d to index area 4, irrespective of the servo sectors.

Each servo sector has pre- and post-gap sections 6 and 8, respectively, for absorbing rotational variations of the disk, and servo information section 7 provided between the sections 6 and 8. Servo information section 7 consists of an erase section E for detecting the servo sector, synchronizing sections S1 and S2 for facilitating the detection of the erase section and position information section PD. Position information section PD has two di-bit configuration position information bit cells A and B. These bit cells each have a width corresponding to one track, and are formed alternately, such that they are deviated by one-half track width with respect to the data track.

Figure 2:
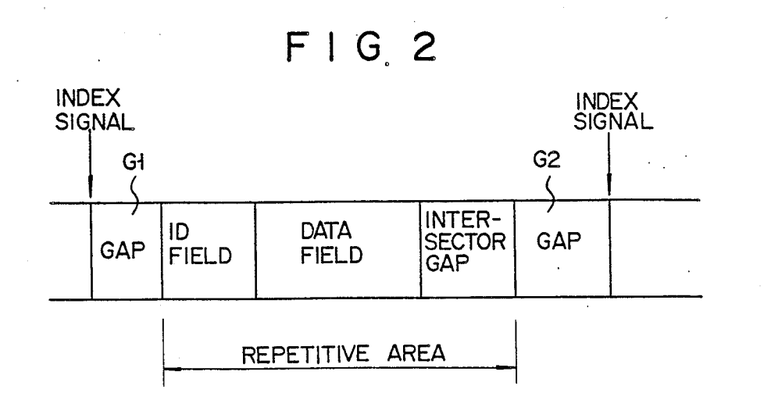
FIG. 2 shows a configuration of a soft sector format pattern.

A track format pattern of a soft sector format has a configuration as shown in FIG. 2. It starts with an index signal followed by gap G1 and then by a repetitive area (which consists of an ID field, a data field and an intersector gap), and ends in gap G2 to absorb rotational variations for one rotation.

In order to write a track format pattern shown in FIG. 2 on magnetic disk 1 with servo sectors 2a to 2d, the ID field and data field in the repetitive area should not overlap the servo information area in the servo sector already-formed irrespective of rotational variations. For this reason, pre- and post-gaps 6 and 8 are provided in each servo sector to absorb rotational variations.

Figures 3A, 3B:
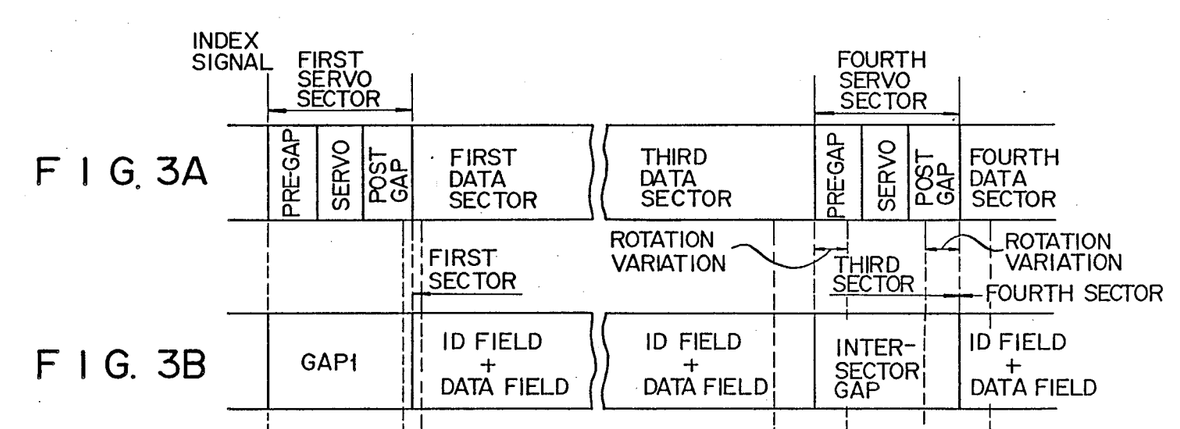
FIGS. 3A to 3D show the relation between the arrangement of servo sectors on a disk and format pattern when rotational variations of the disk occur.
Figures 3C, 3D:
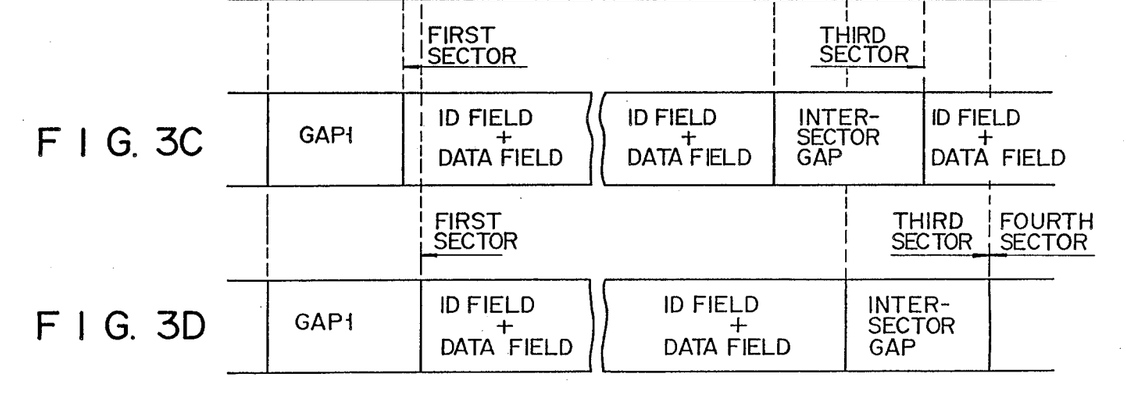

FIG. 3A shows the relation between already-formed servo sectors and data sectors. FIGS. 3B to 3D show format patterns when there is no rotational variation, when the rotation is slower and when the rotation is quicker, respectively. As is understood from the drawings, it is necessary to determine the length of pre- and post-gaps 6 and 8 in the servo sector such that the servo area of the fourth sector will not overlap the ID field and data field of the third and fourth sectors irrespective of rotational variations, in order to permit formatting so as not to erase servo information on the disk.

For example, where the rotational variation of the disk is ±1% and there are 32 sectors, the length of pre- and post-gaps 6 and 8 in the servo sector may be approximately 0.1% of the track capacity. More specifically, the length of the repetitive area is 325 bytes, servo information is 10 bytes, and pre- and post-gaps are each 10 bytes. The track capacity is slightly smaller compared to that in the non-servo system, but substantially the same compared to that of the index servo system. Thus, it will be understood that there is substantially no problem even if servo information is formed over two to four sectors.

In the above example, the pre- and post-gaps are formed with a sufficient length in order that the ID field and data field in the third and fourth sectors will not overlap the servo area, that is, the servo information is always in the inter-sector gap, even if a maximum rotational variation of the disk occurs. However, since the maximum rotational variation of the disk occurs only rarely, actually the length of the pre- and post-gaps may be one half the value mentioned in the above example. In other words, formatting can be effected only when servo information is in the inter-sector gap by judging whether the servo information is in the inter-sector gap at all times. This is because the servo information is in the inter-sector gap at least once in several rotations of the disk so long as rotational variations occur randomly.

Figure 4:
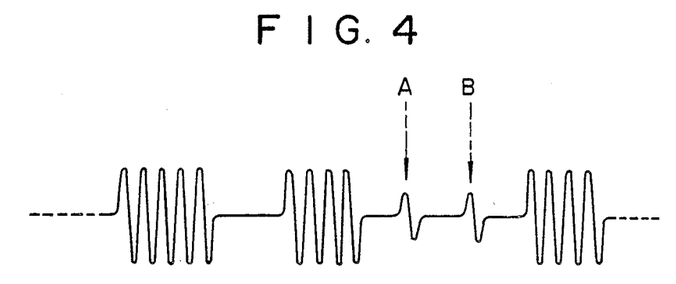
FIG. 4 shows a waveform diagram of a servo information signal read out by a magnetic head.

Now, a method of positioning the magnetic head on a data track using embedded servo information bit cells in magnetic disk 1 is shown in FIG. 1. When magnetic head 5 is positioned on track N, the output signal of head 5 has a waveform as shown in FIG. 4. Thus, signals corresponding to position information bit cells A and B have an equal amplitude. Therefore, to position the magnetic head on the data track, the head position may be controlled such that the signals obtained from position information bits A and B have an equal amplitude.

Figure 5:
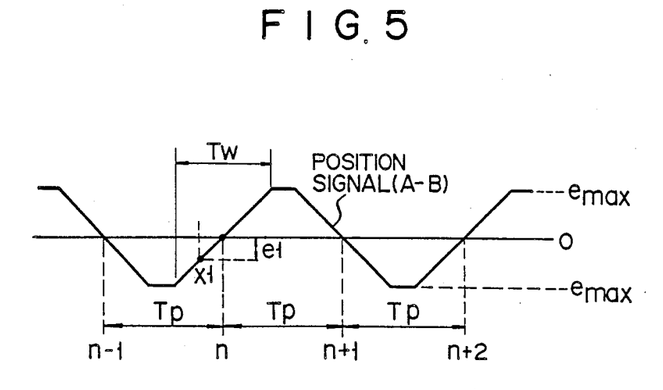
FIG. 5 shows a position information signal obtained from the servo information pattern as a function of the head position.

FIG. 5 shows a position signal which is the difference (A— B) between peak values of signals corresponding to position information bit cells A and B contained in the output signal of the head. As is shown, the position signal (A— B) is a function of the position of head 5. When the head is at a position corresponding to the inclined portions of the position signal, the offtrack amount of the head can be determined from the level of the position signal. It is assumed that the magnetic head is at position X1. Then, denoting the track width by Tw, the track pitch by Tp, the maximum value of position signal by emax, the level of position signal at position X1 by el, the off-track amount δ of the magnetic head is given by $$\delta = (el/2emax) \cdot Tw \quad (1)$$

This means that the off-track amounts when the magnetic head is brought to the N-th track is expressed by equation (1) when the level of the position signal obtained from the servo area is el. To remove the offtrack so that the magnetic head is accurately on the N-th track, the level el should be adjusted to 0 by varying the balance of A and B phase currents in a stepping motor driving the head. The polarity of the position signal is opposite in the even and odd tracks as is seen from the Figure.

In the instant embodiment of the invention four servo sectors are provided, as shown in FIG. 1. Thus, a position signal is obtained for each servo sector. If only a single position information signal is obtained for one rotation of the disk, a problem arises in that positioning of the head can no longer be obtained when the position information is lost, due to a defect of the disk, or deteriorated, due to external noise. Where a plurality of position information signals are obtained, their average can be obtained, so that it is possible to increase the precision of the position information signal and improve the noise immunity. From this sole standpoint, as many position information signals as possible are desired. With an increase in the number of position information signals, however, the servo area is increased. Therefore, two to four servo sectors are generally used. Where the signal-to-noise ratio of the position information signal is inferior, or where there are only two servo sectors, a burst-like di-bit pattern may be used as the position information bit cells.

The reproduced position information signal usually varies between the outer periphery where the linear velocity is high and the inner periphery where the linear velocity is low. This means that the amplitude of the position signal (A − B) varies with the track position, thus making accurate head positioning impossible. Accordingly, in the prior art head positioning device, the position signal (A − B) is normalized with (A + B) using an AGC circuit. However, since the reproduced waveform varies with the track position, the output amplitude of the AGC circuit varies with the track position, even if the input signal has a fixed amplitude. In the embodiment of the invention, the position signal (A − B) is normalized with (A + B) without use of any AGC circuit, thus permitting accurate positioning of the head, irrespective of the track position.

Figure 6:
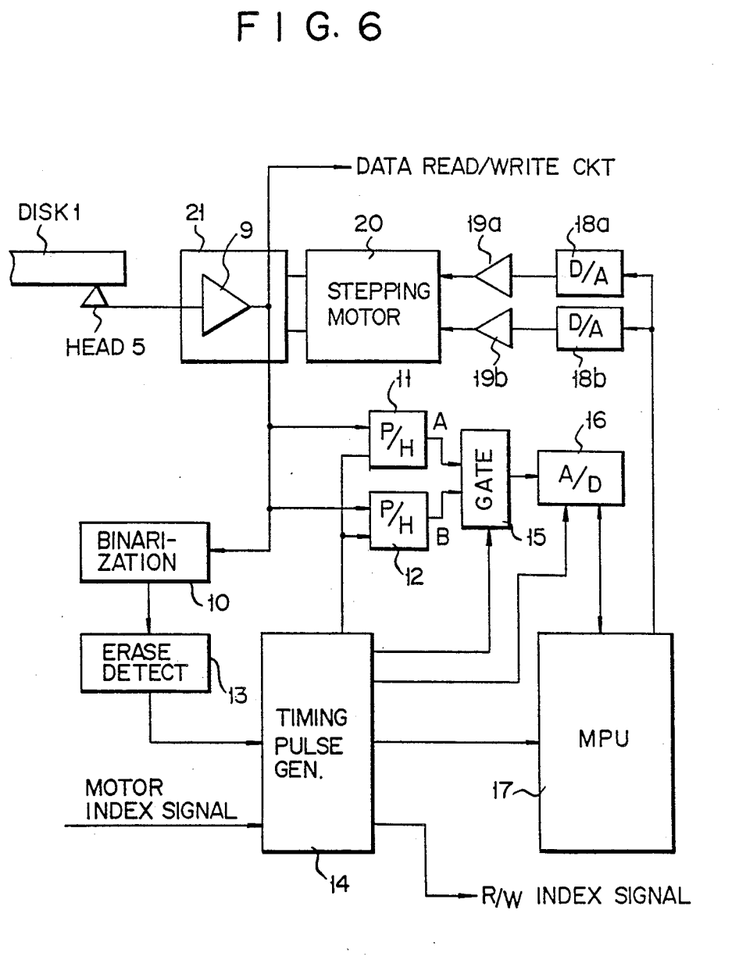
FIG. 6 is a block diagram of a head positioning system for realizing a data-surface servo system for use with the magnetic disk shown in FIG. 1.

FIG. 6 shows a construction of a device for positioning magnetic head, which is used for the magnetic disk with embedded servo information bit cells, described above. The reproduced signal of magnetic head 5 is amplified through amplifier 9 to be fed to thresholding or circuit 10 and peak hold circuits 11 and 12. The bilevel output signal of thresholding circuit 10 is fed to erase detection circuit 13. Erase detection circuit 13 consists, for instance, of a re-triggerable mono-stable multivibrator. It produces an erase detection signal by detecting a longest zero level portion of the bi-level signal pulse. The erase detection signal provides a time reference to decode the servo information. This signal is fed to timing pulse generator 14. Timing pulse generator 14 generates hold signals and hold clear signals which are fed to peak hold circuits 11 and 12, gate switching signal, A/D conversion instruction signal and R/W index signal, in response to a motor index signal, which is obtained from a spindle motor (not shown) for rotating the magnetic disk, and the rise of the erase detection signal.

Peak hold circuits 11 and 12 hold the peaks of servo information signals A and B in response to the hold signal from the timing pulse generator 14. The output signals of peak hold circuits 11 and 12 are fed through gate circuit 15, which is responsive to the gate switching signal, to analog-to-digital (A/D) converter 16. A/D converter 16 converts the peaks of servo information signals A and B into digital signals in response to the A/D conversion instruction signal from timing pulse generator 14. The digital value of the servo information signal is fed to microprocessor unit (MPU) 17. MPU 17 produces the position signal (A − B) from successively supplied servo information signals A and B and normalizes the signal (A − B) with (A + B) to produce a normalized position signal (A − B)/(A + B). MPU 17 positions the head according to the normalized position signal.

MPU 17 computes off-track amount $\delta$ of magnetic head 5 from the position signal and controls A and B phase drive currents in stepping motor 20 according to the off-track amount $\delta$ through D/A converters 18a and 18b and current drivers 19a and 19b. Stepping motor 20 drives head carriage 21 to move head 5.

The processing of MPU 17 will now be described in connection with a case where there are four embedded servo sectors.

The position information signals obtained from the individual servo sectors are denoted by a1 to a4, respectively. They each vary from 0 to 2emax. The permissible fluctuation value of the position information signals is preliminarily set to b0. The corresponding off-track amount $\delta$ is $$\delta 0 = (b0/2emax) \cdot Tw \quad (2)$$

The value of b0 is determined by taking the signal-to-noise ratio, external noise and positioning errors into consideration. It is set to approximately 10% of 2emax.

To minimize the defects of servo information bit cells and influence of external noise, MPU 17 performs the following process.

Of the four position information signals the maximum one ap and minimum one aq are removed, and the average m2 of the remaining two position information signals is obtained as follows:

$$m2 = \sum_{i \neq p,\ i \neq q} ai/2 \quad (3)$$
$$(i = 1 \text{ to } 4)$$

Then, |m2−ai| is obtained, and the following judgement is performed.

$$b0/2 - |m2 - ai| \geq 0 \quad (4)$$

(1) When the four position information signals all satisfy equation (4), they are all normal. In this case, the average of the four position information signals is obtained as follows:

$$m0 = \Sigma ai/4$$

and is utilized as the position information signal for positioning the head. From this position information signal the off-track amount $\delta$ is given by $$\delta = (m0/2emax) \cdot Tw \quad (6)$$

MPU 17 controls the A and B phase drive currents in stepping motor 20 such that off-track amount $\delta$ becomes zero.

(2) When one of the four position information signals fails to satisfy equation (4), this signal ap is removed. The average of the remaining three normal position information signals is obtained as follows:

$$mi = \sum_{i \neq p} ai/3 \quad (7)$$

As in case (1), the off-track amount $\delta$ is obtained to control the driving currents of the stepping motor so that $\delta$ becomes 0.

(3) When two of the four position signals fail to satisfy equation (4), the average of the two normal position signals is obtained to control the drive currents in the motor in the described manner.

(4) When three or more of the four position information signals fail to satisfy equation (4), it is difficult to accurately judge the level of the normal position information signal. In this case, therefore, the position information signals obtained from the servo area are regarded to be defective, and MPU 17 does not control the stepping motor drive currents.

Figure 7A:
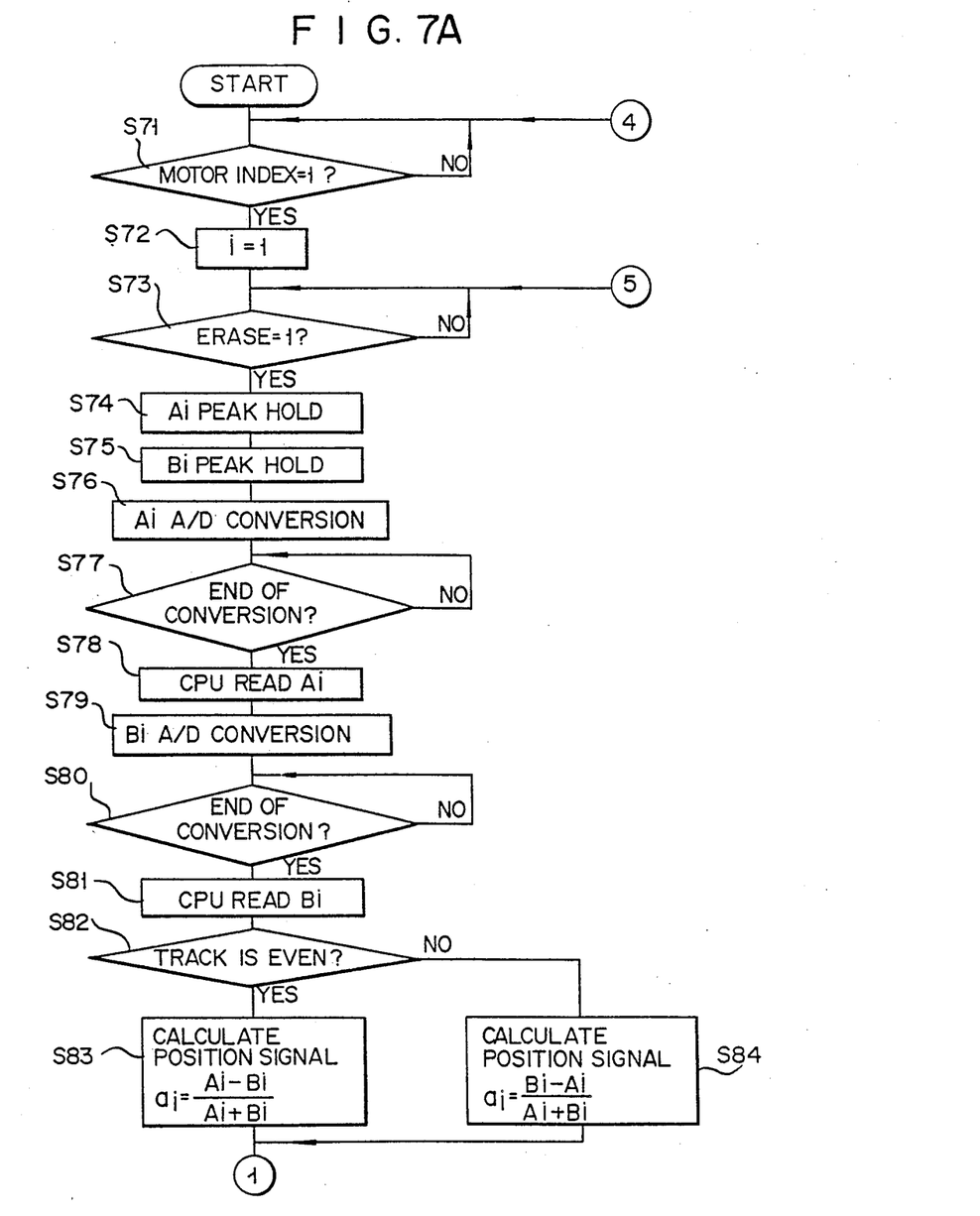
FIGS. 7A to 7C are flow charts for explaining the operation of the device shown in FIG. 6.
Figure 7B:
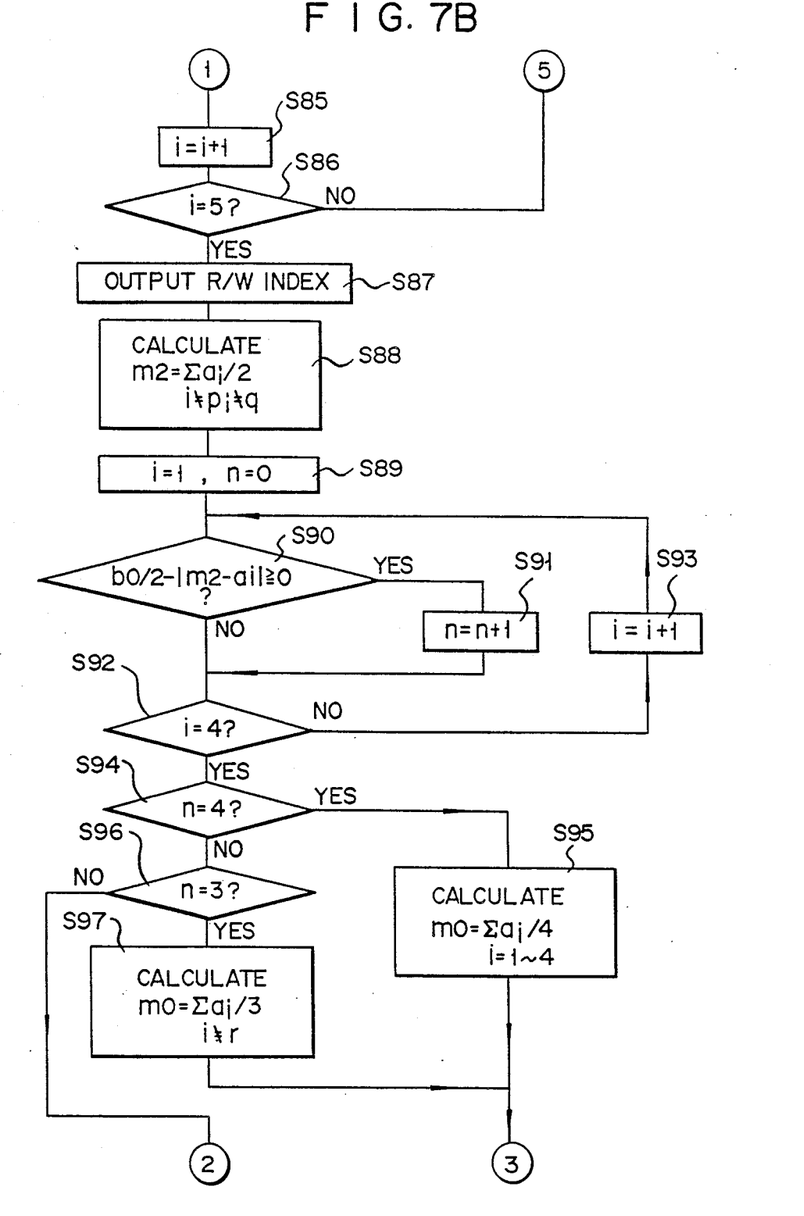
Figure 7C:
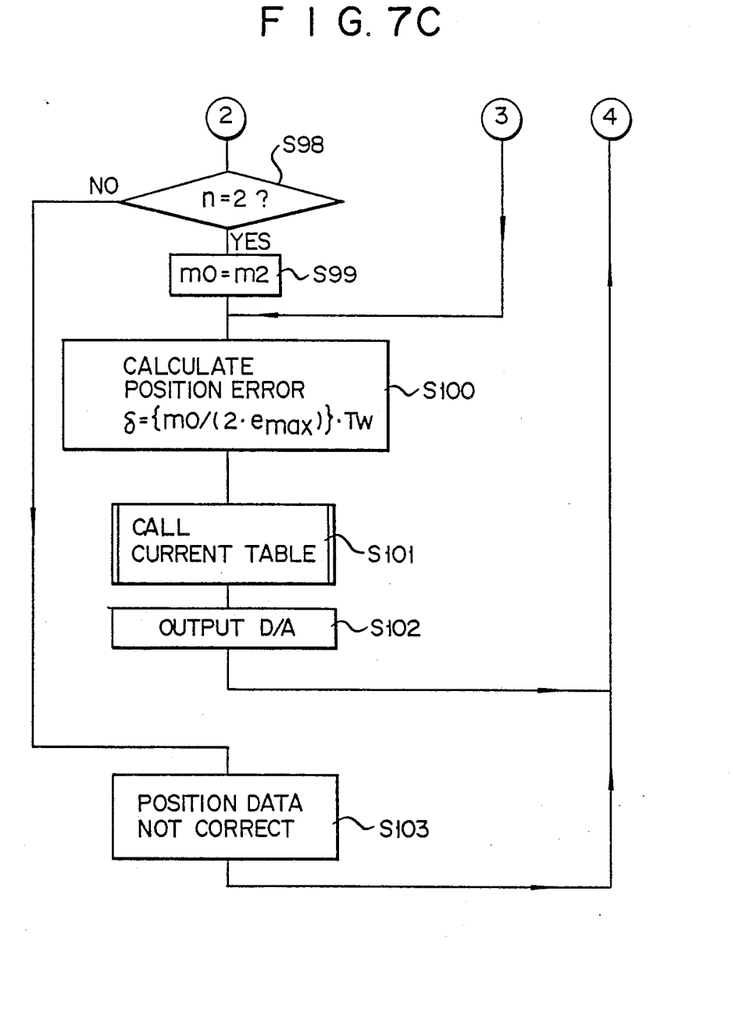

Now, the operation of the MPU for a magnetic disk having four servo sectors 2a to 2d will be described with reference to the flow charts of FIGS. 7A to 7C. A position information signal obtained from each servo sector is referred to as ai (i =1 to 4).

When magnetic head 5 enters index area 4, the motor index signal goes to "1". In step S71, a check is done as to whether the motor index signal is "1". This check is done through timing pulse generator 14, to which the motor index signal is fed. If it is judged that the motor index signal is "1", step S72 is executed, in which "1" is preset in an i counter in MPU 17 for counting the position information signal ai. Then a check is done in step S73 as to whether head 5 is on the erase section of servo sector. This check is done according to the erase detection signal. If the erase section is detected, step S74 is executed, in which servo information Ai of servo sector 2a is held in peak hold circuit 11. In subsequent step S75, servo information Bi is held in peak hold circuit 12. Servo information Ai is fed through gate circuit 15 to A/D converter 16 to be converted into a digital signal in step S76. In step S77, a check is done as to whether the A/D conversion has been completed. If the completion of the A/D conversion is detected, MPU 17 reads out servo information Ai in step S78. In step S79 servo information Bi is converted into a digital signal. In step S80, a check is done as to whether A/D conversion of servo information Bi has been completed. If the completion of the A/D conversion is detected, MPU 17 reads out servo information Bi in step S81. In step S82 a check is done as to whether magnetic head 5 is positioned on an even track. This check is done through a check of the count of counter in MPU 17 for counting tracks.

The polarity of the position signal varies depending on whether the head is positioned on an even or odd track, as mentioned before. When the head is on an even track, step S83 is executed, in which MPU 17 produces normalized position signal ai = (Ai − Bi)/ (Ai + Bi). When the head is on an odd track, step S84 is executed, in which MPU 17 produces normalized position signal (Bi − Ai)/ (Ai + Bi). The normalization of the position signal is done in order that an accurate position signal can be produced, regardless of which track of the disk the head is on.

In subsequent step S85, the i counter is incremented by "1". In step S86, a check is done as to whether the count of the i counter is "5", i.e., the operations mentioned above are being performed with respect to four servo sectors. If the operation is not being performed with respect to four servo sectors, operation is performed from step S73.

When position information signals have been produced with respect to all the servo sectors, an R/W index signal is provided from timing pulse generator 14 in step S87. This signal is fed to a data read/write circuit (not shown). In subsequent step S88, MPU 17 calculates average value m2 of two of the four position information signals, except for the maximum and minimum values ap and aq. In subsequent step S89, "1" is preset in the i counter, and also "0" is preset in an n counter in the MPU for counting the number of times the condition of step S90 is satisfied. In step S90, a check of equation (4) is performed. If the condition of equation (4) is satisfied, the n counter is incremented by "1" in step S91. In subsequent step S92, a check is done as to whether the count of the i counter is "4". If it is not "4", step S93 is executed, in which the i counter is incremented by "1". The check in step S90 is done for the four servo sectors.

In step S94 a check is done as to whether the count of the n counter is "4". When n = 4, step S95 is executed, in which an average value m0 of the four position information signals is calculated. When n ≠ 4 and it is judged in step S96 that n is "3", step S97 is executed, in which an average value m0 of three position information signals is calculated. If it is judged in step S96 that n is not "3", a check is done in step S98 as to whether n is "2". If it is "2", value m2 obtained in previous step S88 is preserved for the calculation of the off-track amount. The value m0 obtained in steps S95 and S97 is also preserved for the off-track amount calculation.

Then the off-track amount (i.e., positional error) $\delta$ is calculated, according to equation (6) in step S100. In subsequent step S101, MPU 17 derives current data corresponding to the off-track amount from a current table which is utilized for reducing the off-track amount to zero by driving stepping motor 20. MPU 17 feeds this current data to D/A converters 19a and 19b.

If three or more of the four position information signals fail to satisfy the condition of step S90, it is judged in step S103 that the position information signals obtained from the servo areas are not correct, so that the stepping motor drive current control is not performed.

In the magnetic disk according to the invention, four servo sectors are provided together with three intervening data sectors. Therefore, if one track has 32 sectors, the disk is rotated by approximately 1/10 rotation to read the first servo sector to the fourth servo sector. If the revolving rate of the disk is 3,600 rpm, the time required for the 1/10 rotation is approximately 1.7 msec. This means that the positioning of the head due to the detection of the position information of the magnetic disk according to the invention is realized with an increase in the seek time of 1.7 msec.

In the above embodiment, after the four position information signals have all been read out, the off-track amount is calculated, and the positioning of the head is done. As a modification, as soon as the first position information signal is read out, the head positioning may be started so long as the read-out information signal is not obviously erroneous. Then, the average is obtained successively with subsequently read-out, obviously correct position information signals, thus effecting rough positioning of the head before the four position information signals have all been read out. In this way, it is possible to reduce the time required for the head positioning which is done after all the four position information signals have been read out.

In the above embodiment, one A/D converter is used to convert servo information signals A and B into digital signals. However, the time required for the A/D conversion may be reduced by using two A/D converters for respective servo information signals A and B.

What is claimed is:

1. A magnetic disk comprising:
   an index area provided in part of said magnetic disk, an index signal being recorded in said index area; and
   a limited number of radially extending servo sections formed only in a partial area spanning only a limited angular region of said magnetic disk and each intervening between selected data sectors positioned subsequent to said index area, each of said servo sections having a servo information area in which a servo information pattern signal is formed, wherein an angular distance traversing each servo section from a first to a last servo section is smaller than an angular distance from the first to the last servo sections when measured in an opposite direction not traversing said plural servo sections.

2. A magnetic disk according to claim 1, wherein first and second gap sections are provided on the opposite sides of said servo information area of each of said servo sectors to absorb rotational variations of said magnetic disk.

3. A magnetic disk according to claim 2, wherein said servo information area of each of said servo sectors has a first synchronizing section with a synchronizing signal recorded therein, an erase section adapted for detection of said servo sector, a second synchronizing section with a synchronizing signal recorded therein, and a position information section in which a plurality of position information bit cells for the positioning of said head are formed.

* * * * *